US011590709B2

(12) United States Patent
Vilajosana et al.

(10) Patent No.: US 11,590,709 B2
(45) Date of Patent: Feb. 28, 2023

(54) BUILD LAYER COVERAGE ANALYSIS

(71) Applicant: HEWLETT-PACKARD DEVELOPMENT COMPANY, L.P., Houston, TX (US)

(72) Inventors: Xavier Vilajosana, Sant Cugat del Valles (ES); Sebastia Cortes i Herms, Barcelona (ES); David Ramirez Muela, Barcelona (ES); Pablo Dominguez Pastor, Barcelona (ES); Alejandro Manuel De Pena, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 922 days.

(21) Appl. No.: 16/069,509

(22) PCT Filed: Mar. 10, 2016

(86) PCT No.: PCT/US2016/021670
§ 371 (c)(1),
(2) Date: Jul. 11, 2018

(87) PCT Pub. No.: WO2017/155533
PCT Pub. Date: Sep. 14, 2017

(65) Prior Publication Data
US 2019/0022950 A1 Jan. 24, 2019

(51) Int. Cl.
*B29C 64/393* (2017.01)
*B33Y 30/00* (2015.01)
(Continued)

(52) U.S. Cl.
CPC .......... *B29C 64/393* (2017.08); *B29C 64/153* (2017.08); *B29C 64/165* (2017.08);
(Continued)

(58) Field of Classification Search
None
See application file for complete search history.

(56) References Cited

U.S. PATENT DOCUMENTS 6,162,378 A    12/2000  Bedal et al.
6,815,636 B2   11/2004  Chung et al.
(Continued)

FOREIGN PATENT DOCUMENTS

EP         1634694        3/2006
WO    WO-2007023292       3/2007
WO    WO-2015062564       5/2015

OTHER PUBLICATIONS

Rudlin, et al., Inspection of Laser Powder Deposited Layers, ECNDT 2014, Oct. 6-10, 2014, 10 pages, Prague, CZ.
International Search Report and Written Opinion for International Publication No. PCT/US2016/021670 dated Dec. 8, 2016, 9 pages.

*Primary Examiner* — Francisco W Tschen
*Assistant Examiner* — Elisa H Vera
(74) *Attorney, Agent, or Firm* — Michael Dryja

(57) ABSTRACT

Examples include apparatuses, processes, and methods for generating three-dimensional objects. An example apparatus comprises build material distributor and a controller. Examples distribute a particular build layer in a build area of the apparatus over a previous build layer. Examples determine a build layer temperature corresponding to the particular build layer. Examples analyze build layer coverage for the particular build layer based at least in part on a build layer temperature of the previous build layer and the build layer temperature of the particular build layer. Examples selectively recoat the particular build layer with additional build material based at least in part on the build layer coverage for the particular build layer.

6 Claims, 9 Drawing Sheets

(51) Int. Cl.

| | | |
|---|---|---|
| | *B33Y 50/02* | (2015.01) |
| | *B33Y 10/00* | (2015.01) |
| | *B29C 64/153* | (2017.01) |
| | *B29C 64/20* | (2017.01) |
| | *B33Y 50/00* | (2015.01) |
| | *B29C 64/165* | (2017.01) |
| | *B29C 64/188* | (2017.01) |

(52) U.S. Cl.
CPC ............ *B29C 64/188* (2017.08); *B29C 64/20* (2017.08); *B33Y 10/00* (2014.12); *B33Y 30/00* (2014.12); *B33Y 50/02* (2014.12); *B33Y 50/00* (2014.12)

(56) References Cited

U.S. PATENT DOCUMENTS

| | | |
|---|---|---|
| 6,925,346 B1 | 8/2005 | Mazumder et al. |
| 6,930,278 B1* | 8/2005 | Chung ............... B23K 35/0244 219/121.85 |
| 8,784,721 B2 | 7/2014 | Philippi et al. |
| 2002/0104973 A1 | 8/2002 | Kerekes |
| 2007/0183918 A1* | 8/2007 | Monsheimer ........... C04B 35/64 419/1 |
| 2012/0100031 A1* | 4/2012 | Ljungblad .......... B23K 15/0013 419/7 |
| 2013/0101729 A1 | 4/2013 | Keremes et al. |
| 2013/0108726 A1 | 5/2013 | Uckelmann et al. |
| 2014/0163717 A1 | 6/2014 | Das et al. |
| 2015/0202826 A1 | 7/2015 | Paternoster et al. |
| 2017/0001243 A1* | 1/2017 | Hayano .................. B22F 12/00 |
| 2019/0022946 A1* | 1/2019 | Jones ................... B29C 64/393 |

\* cited by examiner

BUILD LAYER COVERAGE ANALYSIS

BACKGROUND

Additive manufacturing systems that generate three-dimensional objects on a layer-by-layer basis are convenient way for producing three-dimensional objects. Examples of additive manufacturing systems include three-dimensional printing systems. The quality of objects produced by additive manufacturing systems may vary widely based on the type of additive manufacturing technology used.

DRAWINGS

Figure 1:
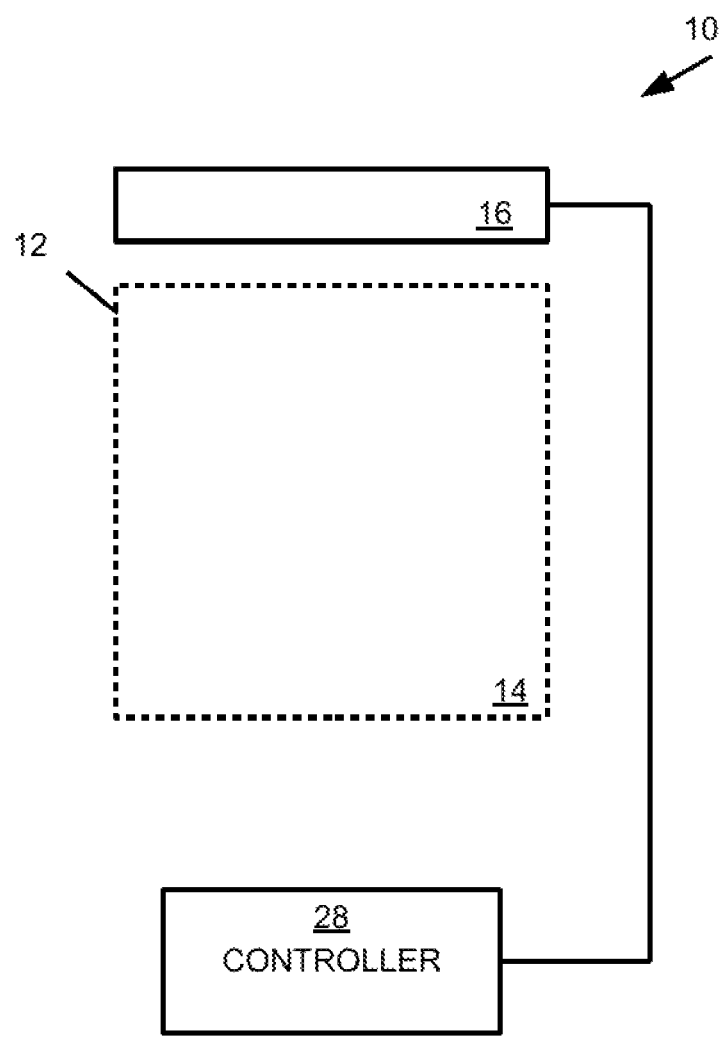

FIG. 1 provides a block diagram of some components of an example apparatus for generating three-dimensional objects.

Figure 2:
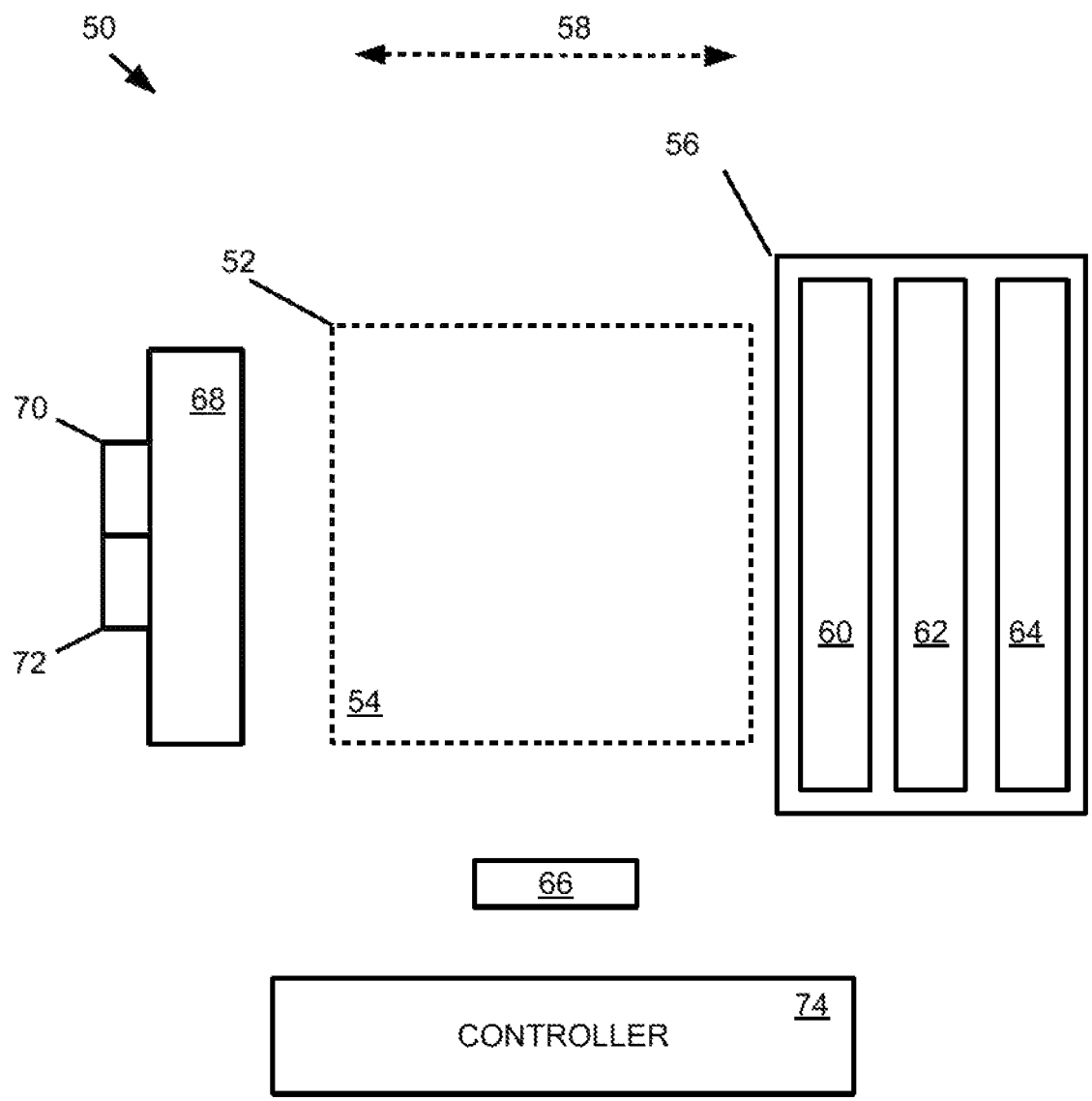

FIG. 2 provides a block diagrams of some components of an example apparatus for generating three-dimensional objects.

Figure 3:
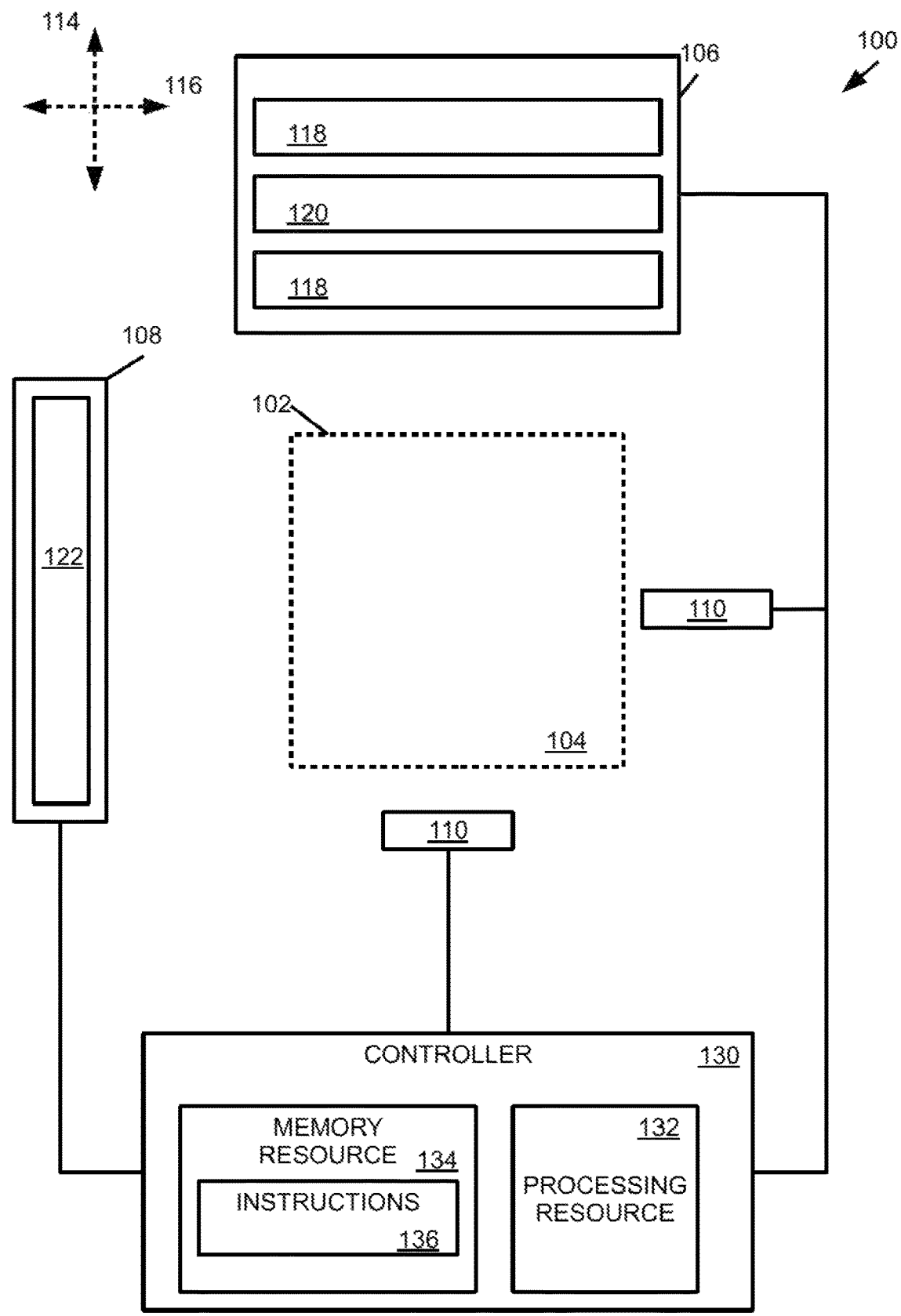

FIG. 3 provides a block diagram of some components of an example apparatus for generating three-dimensional objects.

Figure 4:
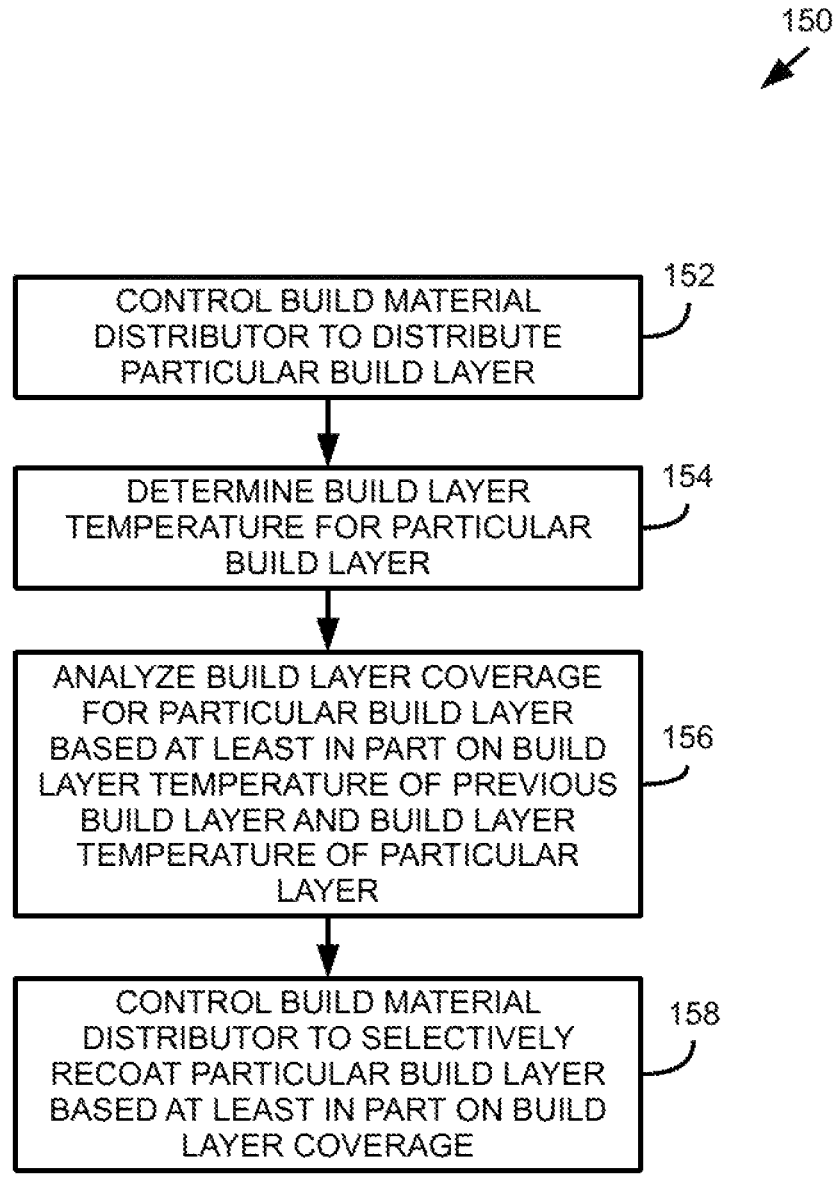

FIG. 4 provides a flowchart that illustrates a sequence of operations that may be performed by an example apparatus.

Figure 5:
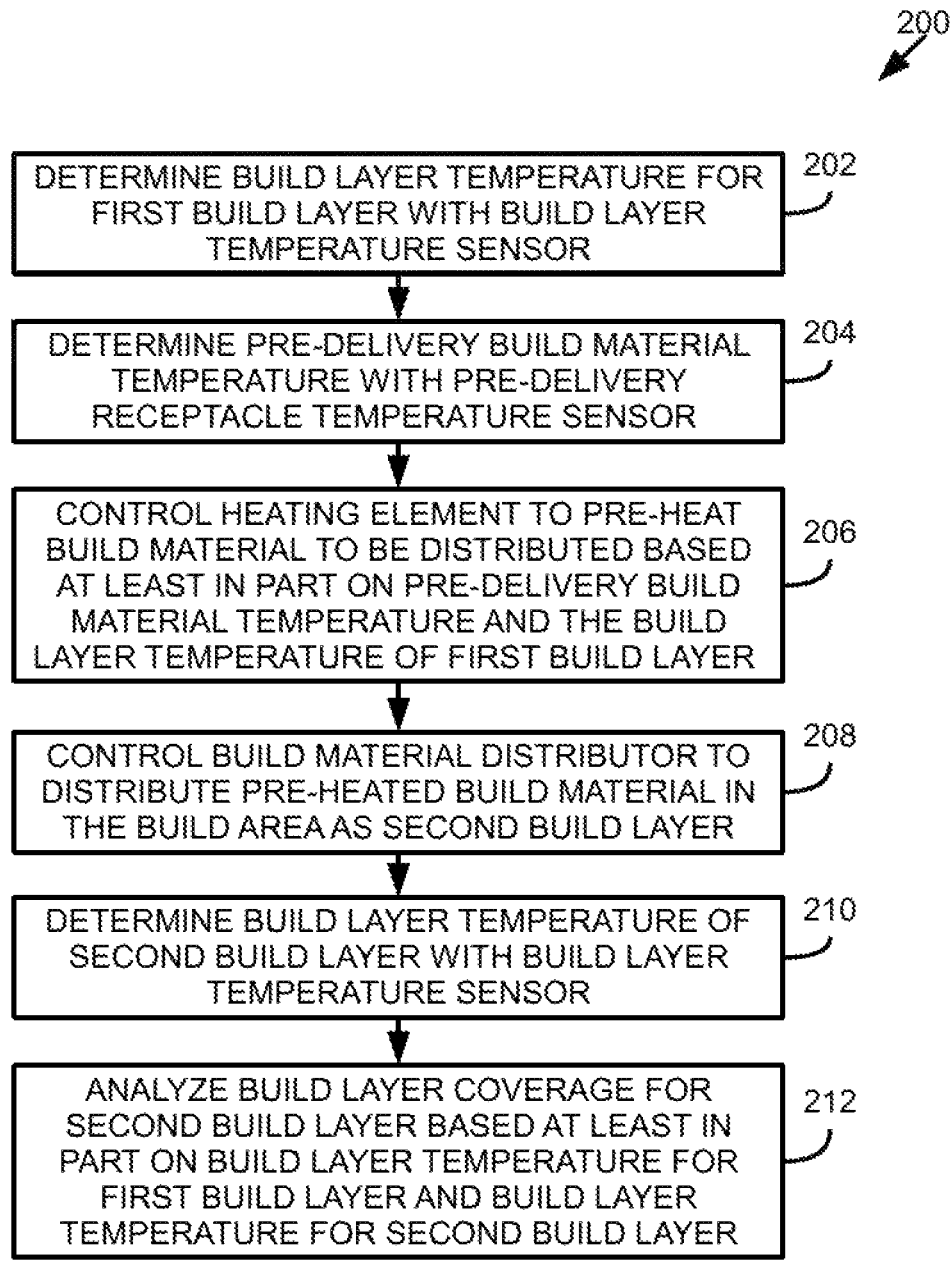

FIG. 5 provides a flowchart that illustrates a sequence of operations that may be performed by an example apparatus.

Figure 6:
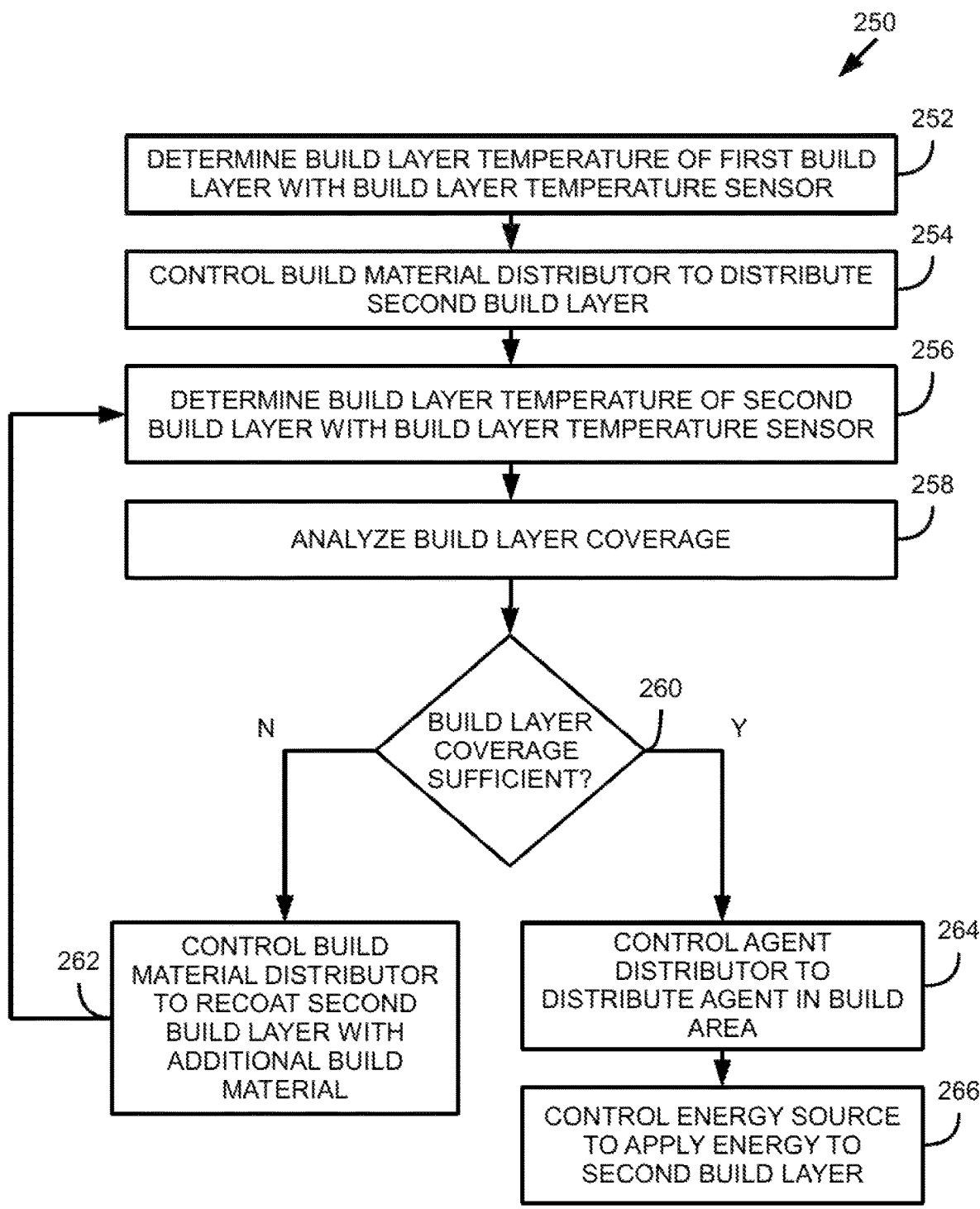

FIG. 6 provides a flowchart that illustrates a sequence of operations that may be performed by an example apparatus.

Figure 7:
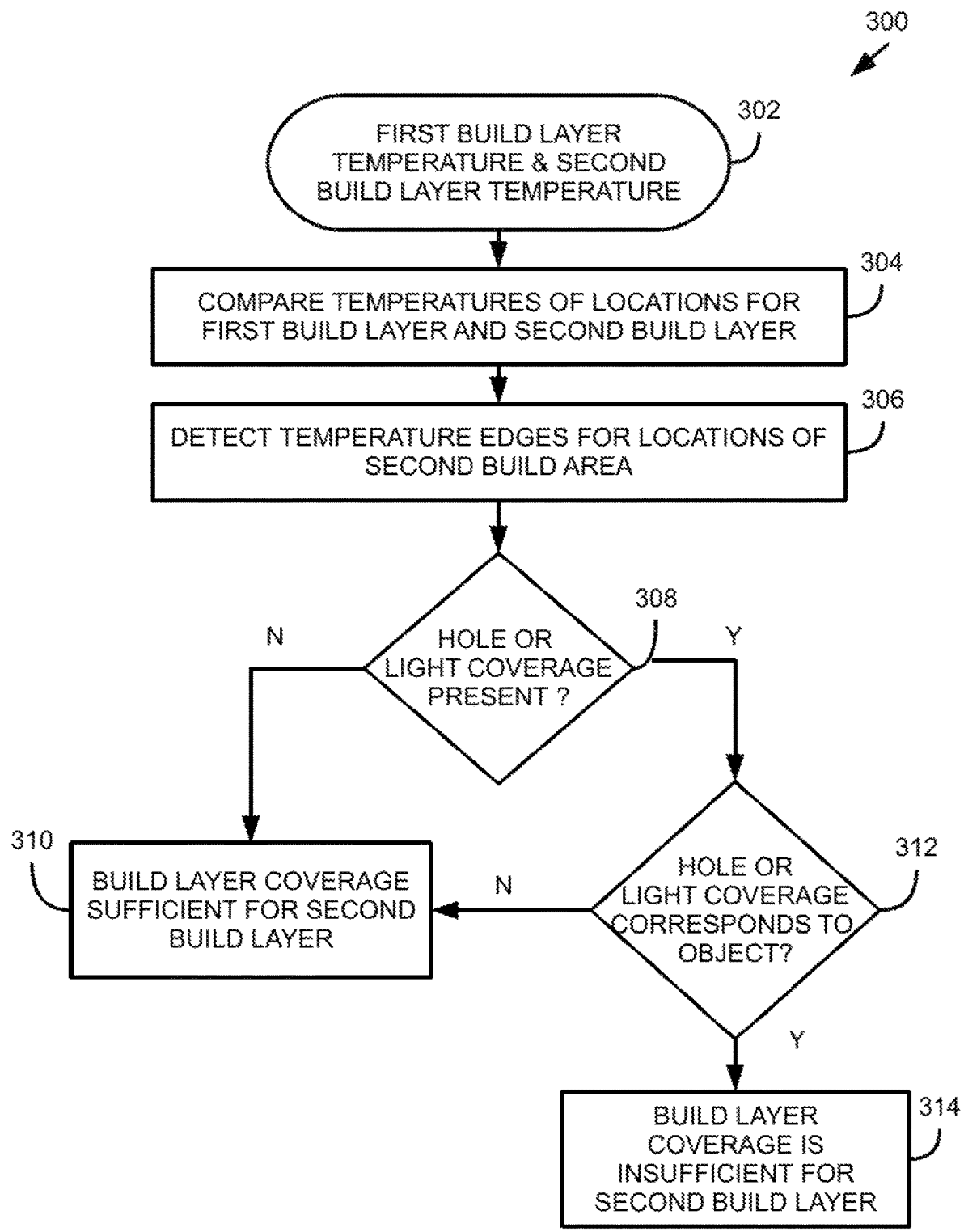

FIG. 7 provides a flowchart that illustrates a sequence of operations that may be performed by an example apparatus.

Figure 8:
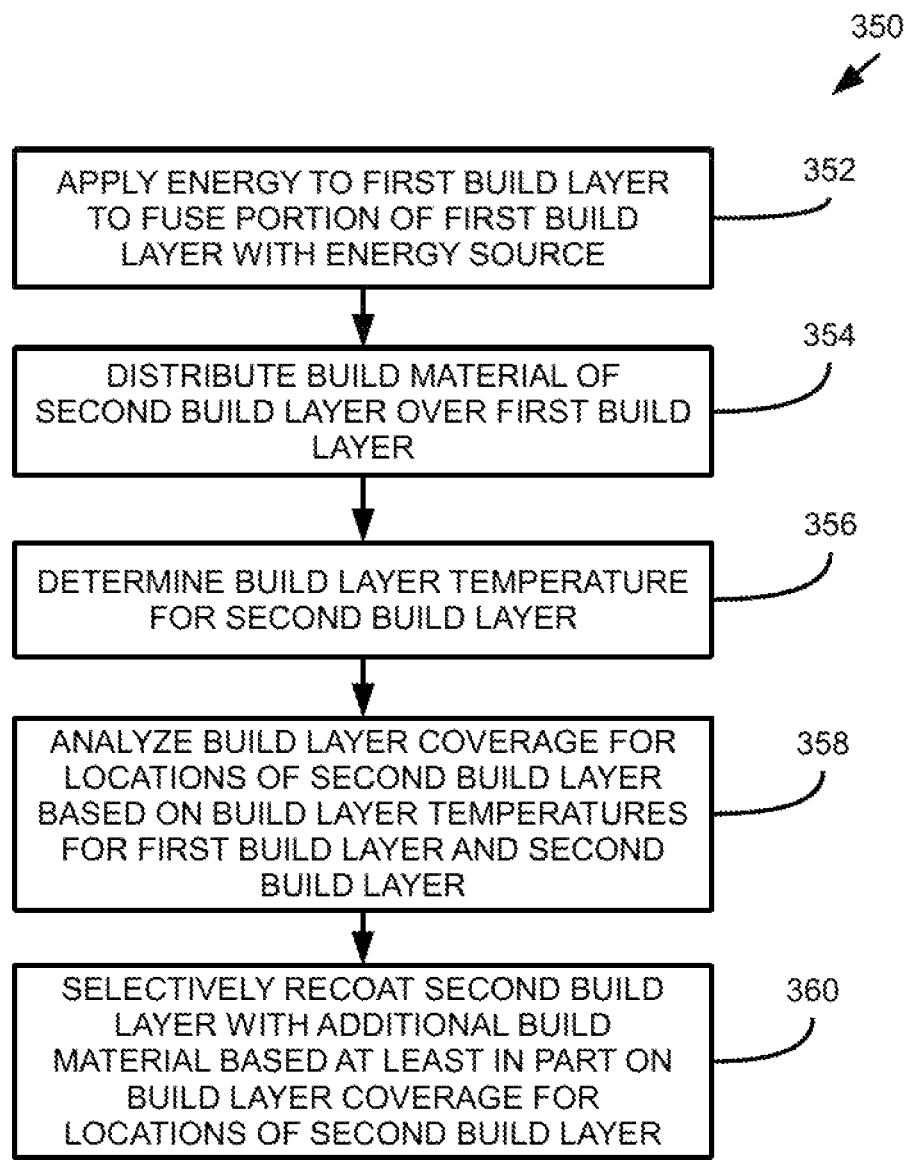

FIG. 8 provides a flowchart that illustrates a sequence of operations that may be performed by an example apparatus.

Figure 9:
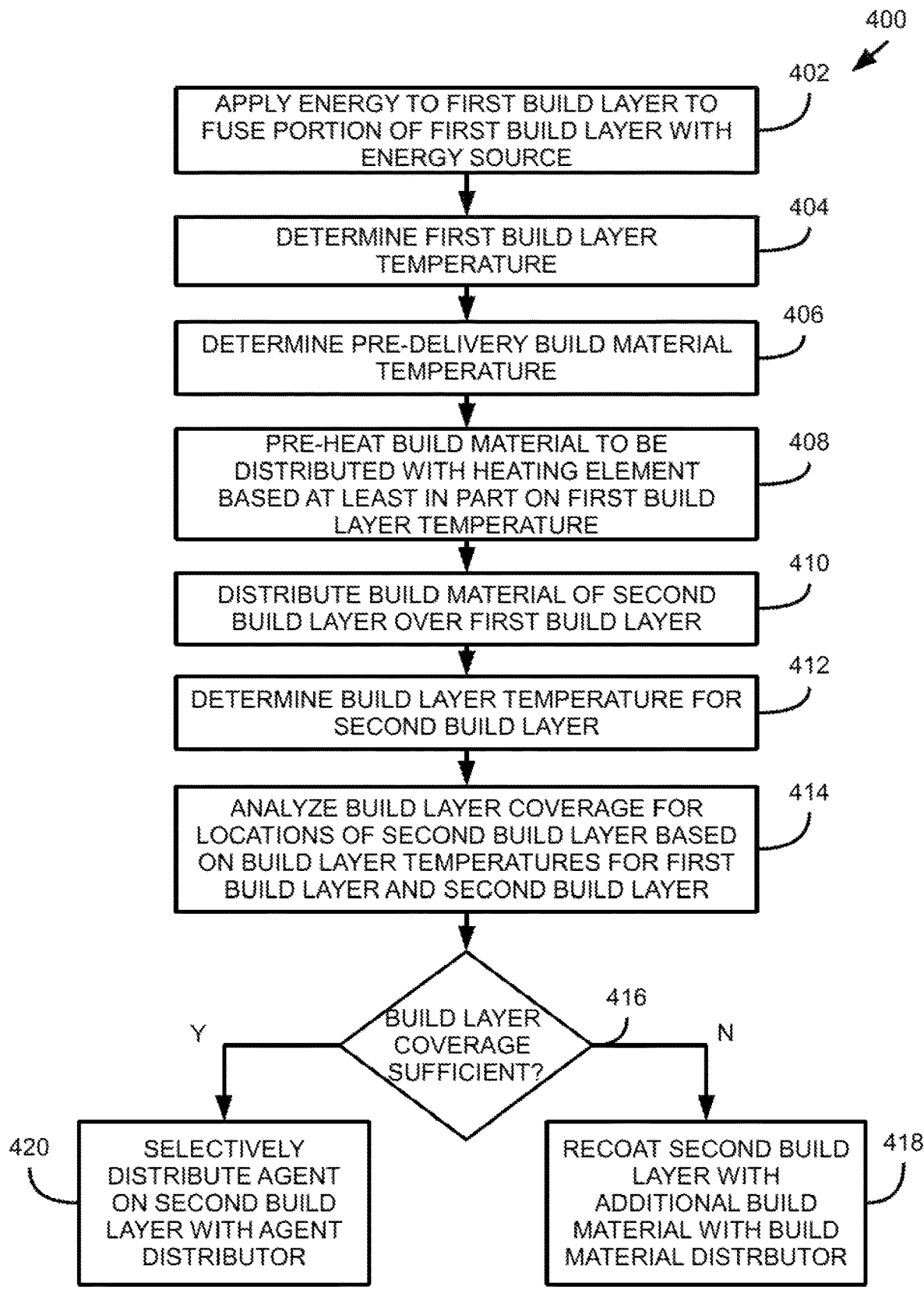

FIG. 9 provides a flowchart that illustrates a sequence of operations that may be performed by an example apparatus.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DESCRIPTION

Examples provided herein include apparatuses, processes, and methods for generating three-dimensional objects. Apparatuses for generating three-dimensional objects may be referred to as additive manufacturing apparatuses. As will be appreciated, example apparatuses described herein may correspond to three-dimensional printing systems, which may also be referred to as three-dimensional printers. In an example additive manufacturing process, a layer of build material may be distributed in a build area of a build material support, an agent may be selectively distributed on the layer of build material, and energy may be temporarily applied to the layer of build material. As used herein, a build layer may refer to a layer of build material distributed in a build area upon which agent may be distributed and/or energy may be applied.

The application of energy may cause portions of the layer of build material to which agent has been applied to begin to coalesce or fuse. In contrast, build material upon which agent was not distributed may not coalesce or fuse due to the application of energy. In some examples, energy may be applied to a build layer with at least one energy source of an example apparatus. Examples of energy sources may comprise a heating element, electromagnetic radiation emitter (e.g., light emitter, infrared emitter, ultraviolet emitter, laser emitter, etc.), and/or a lamp (e.g., a halogen lamp).

The temperature at which portions of the layer of build material may begin to coalesce or fuse may be referred to as a fusing temperature. Upon cooling, portions of the build material layer that have coalesced become solid and form part of a three-dimensional object being generated. Accordingly, the portions of the build material layer upon which agent is selectively distributed (and which become solid) may be referred to as the "part area" of the build layer.

Additional layers may be distributed and the operations described above may be performed for each layer to thereby generate a three-dimensional object. As will be appreciated, a part area of each layer may correspond to a cross-section of a three-dimensional object to be formed. Sequentially layering and fusing portions of layers of build material on top of previous layers may facilitate generation of the three-dimensional object. The layer-by-layer formation of a three-dimensional object may be referred to as a layer-wise additive manufacturing process. In some examples, a height of a build layer (which may also be referred to as thickness) may be in the micron scale. For example, some example build layer heights may be in the range of approximately 60 to approximately 150 microns. Furthermore, an overall build height of the cumulative layers of build material may be in the centimeter or meter scale depending on the apparatus and process implemented.

In examples described herein, a build material may include a powder-based build material, where powder-based build material may comprise wet and/or dry powder-based materials, particulate materials, and/or granular materials. In some examples, the build material may be a weak light absorbing polymer. In some examples, the build material may be a thermoplastic. Furthermore, as described herein, agent may comprise fluids that may facilitate fusing of build material when energy is applied. In some examples, agent may be referred to as coalescing or fusing agent. In some examples, agent may be a light absorbing fluid, an infrared or near infrared absorbing fluid, such as a pigment colorant.

As will be appreciated, various types of build materials may have differing material properties. Performance of various operations of a layer-wise additive manufacturing process as described herein may be based at least in part on material properties of a build material used in such process. Example material properties may include critical temperature (e.g., a temperature corresponding to a critical point that is an end point of a phase equilibrium), emissivity, absorbance, thermal conductivity, thermal diffusivity, thermal expansion, photosensitivity, reflectivity, melting point, coefficient of thermal expansion, plasticity, elasticity, permeability, reactivity, surface energy, electrical conductivity, permittivity, and/or other such material properties.

In some examples, an apparatus may comprise a build material support, where a surface of the build material support may correspond to a build area. Accordingly, a starting layer of build material may be distributed on the surface of the build material support in the build area. Subsequent layers of build material may be distributed in the build area on previously distributed and processed layers. Furthermore, apparatuses may comprise energy sources with which to temporarily apply energy to build material layers to heat the build material layers to thereby pre-fuse and/or fuse the build material layers. For example, an apparatus may comprise at least one energy source that may heat a build material layer such that portions of the build material layer where agent has been distributed may fuse. In some examples, apparatuses may further comprise additional energy sources with which to preheat build material layers.

In addition, example apparatus may comprise an agent distributor. In some examples, an agent distributor may comprise a printhead or printheads (e.g., a thermal ejection based printhead, a piezoelectric ejection based printhead, etc.). In some examples, an agent distributor may be coupled to a scanning carriage. In one example, printheads suitable for implementation in commercially available inkjet printing devices may be implemented as an agent distributor. In other examples, an agent distributor may comprise other types of fluid ejection devices that selectively eject small volumes of fluid. In some examples, an agent distributor may comprise at least one printhead that comprises a plurality of fluid ejection dies arranged generally end-to-end along a width of the agent distributor. In some examples, the at least one printhead may comprise a plurality of printheads arranged generally end-to-end along a width of the agent distributor. In such examples, a width of the agent distributor may correspond to a dimension of a build area. For example, a width of the agent distributor may correspond to a width of a build area.

In some examples, apparatuses may comprise a build material distributor to distribute build material in the build area. A build material distributor may comprise, for example, a wiper blade, a roller, and/or a spray mechanism. In some examples, a build material distributor may be coupled to a scanning carriage. In these examples, the build material distributor may distribute build material in the build area as the scanning carriage moves over the build area along the scanning axis to thereby distribute a layer of build material in the build area.

In some examples of apparatuses for generating three-dimensional objects, build layer coverage corresponds to an amount of build material distributed at locations of the build area for a particular build layer. In particular, if build material is not evenly distributed for a build layer, build layer coverage may be insufficient for performing operations of a layer-wise additive manufacturing process. As will be appreciated, build layer coverage may be related to overall three-dimensional object generation accuracy and quality. For example, if build material was not distributed (which may be referred to as insufficient build layer coverage) at some locations of a build layer, formation of a cross-section of an object corresponding to the build layer may not be accurate at such locations. As another example, if an amount of build material distributed at some locations of a build layer was less than expected (which may be referred to as insufficient build layer coverage), formation of a cross-section of an object corresponding to the build layer may not be accurate at such locations. As used herein, analyzing build layer coverage comprises determining whether a sufficient or insufficient amount of build material has been distributed at locations of a build layer.

Example apparatuses, processes, and methods described herein analyze build layer coverage for a distributed build layer. In particular, examples may analyze build layer coverage based at least in part on build layer temperature, where build layer temperature includes measured temperatures at locations of a build layer. Hence, a build layer temperature generally corresponds to a temperature profile for a build layer that includes temperatures at various points (locations) of the build layer. In some examples, if a particular build layer is distributed over a previous build layer in the build area, some examples may analyze build layer coverage of the particular build layer based at least in part on a build layer temperature of the previous build layer and a build layer temperature of the particular build layer.

Example apparatuses comprise at least one build layer temperature sensor with which to determine a build layer temperature of a layer of build material distributed in a build area of the apparatus. The build area may be described with regard to a two-dimensional coordinate system such that locations of the build area may be defined according to a two-dimensional coordinate system. Accordingly, locations of a distributed build layer may also be described with corresponding locations. Examples herein may further determine a temperature for each location of each build layer. Examples of a build layer temperature sensor may comprise an infrared temperature sensor, a thermal vision sensor, infrared camera, and/or other types of sensors that may be used to determine temperatures for locations of a build layer of build material.

As discussed above, a build layer is composed of build material distributed in the build area. For a given apparatus, a particular build layer height is expected for efficient and accurate operation in performing operations of an additive manufacturing process. For example, some apparatuses operate with a build layer height in a range of approximately 60 to approximately 150 microns. In other examples, build layer heights may be in different ranges. Build layer coverage corresponds to uniformity of build layer height at locations of a build layer and adequacy (e.g., sufficiency) of the amount of build material at locations of the build layer. As will be appreciated, approximate uniformity of build material and within an expected range may be needed for efficient and accurate operation of an example apparatus. Accordingly, examples may analyze build layer coverage for a build layer to determine whether the build layer uniformity is sufficient or insufficient.

A sufficient build layer uniformity corresponds to a build layer having an approximately uniform distribution of build material within an expected range of build layer height. An insufficient build layer uniformity corresponds to a build layer that does not have an approximately uniform distribution of build material or a build layer height not within an expected range. As will be appreciated, build layer height corresponds to an amount of build material distributed at a respective location. As used herein, "approximate" with regard to numerical values may indicate a range of ±10%. As used with regard to build layer uniformity, approximately uniform indicates that build material height at locations of a build layer are within a range of ±10%. Examples provided herein may analyze build layer coverage for a build layer based at least in part on temperatures for locations of the build layer and temperatures of corresponding locations of a previous layer.

Furthermore, in some examples described herein, a first build layer of build material and a second build layer of build material may be described. It will be appreciated that "first" and "second" are merely used for illustrative purposes. For consistency, some examples provided herein describe a topmost build layer of build material as a second build layer, and examples describe a build layer upon which a topmost layer of build material is distributed as a first build layer. Accordingly, it will be appreciated that in some examples first and second build layers may be sequential layers in a layer-wise additive manufacturing process. However, it will be noted that first and second do not necessarily describe an overall order of such build layers.

Turning now to the figures, and particularly to FIG. 1, this figure provides a block diagram of some components of an example apparatus 10 for generating a three-dimensional object. In this example, the apparatus 10 may comprise a build material support 12 having a surface that corresponds to a build area 14. In this example, the build material support 12 is illustrated with dashed lines to reflect that a build material support may not be included in some examples. As will be appreciated, layers of build material may be distributed in the build area 14 on the surface of the build material support 12. Furthermore, in this example, the apparatus 10 comprises a build material distributor 16 to distribute respective build layers of build material in the build area 14. The apparatus 10 further comprises a controller 28 connected to the at least one build material distributor 16. In such examples, the controller 28 is to control the build material distributor 16 to distribute a particular build layer in the build area 14 over a previous build layer. The controller 28 determines a build layer temperature corresponding to the particular build layer, and the controller analyzes build layer coverage for the particular build layer based at least in part on a build layer temperature of the previous build layer and the build layer temperature of the particular build layer. As will be appreciated, the controller may perform the operations for each layer of a layer-wise additive manufacturing process to generate a three-dimensional object. Furthermore, it will be appreciated, that in some examples, the controller 28 determines a build layer temperature based at least in part on sensor data received from one or more temperature sensors.

A controller, such as the controller 28 of the example apparatus 10, may comprise a processing resource and/or a memory resource. A processing resource may comprise one or more general purpose data processors and/or one or more specialized data processors. For example, a processing resource may comprise a central processing unit (CPU), a graphics processing unit (GPU), an application-specific integrated circuit (ASIC), a controller, and/or other such configurations of logical components for data processing.

A memory resource may comprise random access memory (RAM) devices as well as other types of memory (e.g. cache memories, non-volatile memory devices, read-only memories, mass-storage resources, etc.). As will be appreciated, a memory resource may be a computer readable and/or machine-readable storage medium (e.g., RAM, ROM, erasable programmable read-only memory (EPROM), electrically erasable programmable read-only memory, flash memory or other solid state memory technology, portable compact disc memory, or other optical storage, or any other medium that may be used to store executable instructions and information).

Therefore, as described herein, a controller may be any combination of hardware and programming to implement the functionalities described with respect to a controller and/or a method. In some examples described herein, the combinations of hardware and programming may be implemented in a number of different ways. For example, the programming for the controller may be processor executable instructions stored on a non-transitory machine-readable storage medium and the hardware for the controller may include a processing resource to execute those instructions. In these examples, an apparatus implementing such controller may include the machine-readable storage medium storing the instructions and the processing resource to execute the instructions, or the machine-readable storage medium may be separately stored and accessible by the apparatus and the controller. In some examples, a controller may be implemented in circuitry.

In the example apparatus 10 of FIG. 1, the controller 28 may control the build material distributor 16. In addition, the controller 28 may be connected to a build layer temperature sensor (not shown in FIG. 1) and the controller may receive sensor data from the build layer temperature sensor. The sensor data may be processed by the controller 28 to determine a build layer temperature of a build layer distributed in the build area 14. In some examples, the controller 28 may control operation of the build material distributor 16 based at least in part on build layer temperatures determined from the sensor data received from the build layer temperature sensor.

For example, the controller 28 may analyze build layer coverage for a build layer in the build area 14, and the controller may control the build material distributor 16 to recoat the build layer with additional build material in response to determining that the build layer coverage is insufficient. In some examples, if the controller 28 determines particular locations of the build layer having an insufficient amount of build material, the controller may control the build material 16 distributor such that additional build material is distributed at such locations. As used herein, recoating a build layer comprises distribution of an additional amount of build material for the build layer. The additional amount of build material may be less than an amount used for distributing a build layer. Moreover, in some examples, recoating a build layer comprises distribution of an additional amount of build material at locations of the build layer determined to have insufficient build layer coverage. In other examples, an additional amount of build material may be distributed over the whole build area for the build layer.

FIG. 2 provides a block diagram that illustrate some components of an example apparatus 50. In this example, the apparatus 50 comprises a build material support 52 having a surface that corresponds to a build area 54 in which layers of build material may be deposited and fused in a layer-wise additive manufacturing process to form a three-dimensional object. In this example, the apparatus 50 comprises a scanning carriage 56 that may move bi-directionally along a scanning axis 58. In this example, the apparatus 50 includes a build material distributor 60, at least one energy source 62, and an agent distributor 64 coupled to the scanning carriage 56. Accordingly, the build material distributor 60, the at least one energy source 62, and the agent distributor 64 may move over the build area along the scanning axis 58 concurrent with movement of the scanning carriage 56.

As shown, a width of the build material distributor 60, at least one energy source 62, and the agent distributor may generally correspond to a width of the build area 54. Furthermore, the width of the build material distributor 60, the at least one energy source 62, and the agent distributor may be approximately orthogonal to the scanning axis 58. Accordingly, as the scanning carriage 56 moves along the scanning axis 58 over the build area 54, the build material distributor 60, the at least one energy source 62, and/or the agent distributor 64 may perform operations associated with a layer-wise additive manufacturing process along a scan line that is approximately orthogonal to the scanning axis 58.

In addition, the apparatus 50 comprises at least one build layer temperature sensor 66. In such examples, a build layer temperature of a build layer in the build area 54 may be determined based at least in part on sensor data generated by the build layer temperature sensor 66. Therefore in this example, the apparatus 50 may coordinate operations to be performed by the build material distributor 60, the at least one energy source 62, and/or the agent distributor 64 based at least in part on sensor data generated by the build layer temperature sensor 66.

Furthermore, the apparatus 50 comprises a pre-delivery receptacle 68 that may store build material prior to distribution. In this example, build material may be stored in the pre-delivery receptacle 68, and the build material distributor 60 may remove build material from the pre-delivery receptacle 68 and distribute such build material in the build area 54. At least one heating element 70 (which may also be referred to as a build material heating element) may be positioned proximate the pre-delivery receptacle 68, where the at least one heating element 70 may be used to heat build material stored in the pre-delivery receptacle 68 prior to distribution of the build material by the build material distributor 60. In some examples, the at least one heating element 70 may comprise an array of heating elements disposed in the pre-delivery receptacle 68. For example, the array of heating elements may comprise an array of resistive heating elements. In addition, the apparatus 50 comprises at least one pre-delivery receptacle temperature sensor 72 that may be used to determine a temperature of build material stored in the pre-delivery receptacle 68.

In this example, the apparatus 50 comprises a controller 74 that may be electrically connected to the scanning carriage 56, the build material distributor 60, the energy source 62, the agent distributor 64, the build layer temperature sensor 66, the heating element 70, and/or the pre-delivery receptacle temperature sensor 72. As will be described in further detail herein, the controller 74 may control the performance of various operations of the scanning carriage 56, the build material distributor 60, the energy source 62, the agent distributor 64, the build layer temperature sensor 66, the heating element 70, and/or the pre-delivery receptacle temperature sensor 72.

FIG. 3 provides a block diagram that illustrates some components of an example apparatus 100 for generating a three-dimensional object. In this example, the apparatus 100 may comprise a build material support 102. In some examples, the build material support 102 may not be included in the apparatus 100; hence, the build material support 102 is illustrated in dashed line. As discussed previously, the build material support 102 may have a build surface that corresponds to a build area 104 in which layers of build material may be sequentially distributed and fused.

The example apparatus 100 comprises a first scanning carriage 106 and a second scanning carriage 108. In addition, the apparatus 100 includes build layer temperature sensors 110. In this example, the first scanning carriage 106 may move bi-directionally over the build area 104 along a first scanning axis 114, and the second scanning carriage 108 may move bi-directionally over the build area 104 along a second scanning axis 116. As will be appreciated, the first scanning axis 114 is approximately orthogonal to the second scanning axis 116. Furthermore, the first scanning axis 114 and the second scanning axis 116 are approximately parallel to a plane of the surface of the build material support 102.

The apparatus 100 comprises energy sources 118 and a build material distributor 120 coupled to the first scanning carriage 106. Accordingly, as the first scanning carriage 106 moves along the first scanning axis 114, the apparatus 100 may distribute a layer of build material in the build area 104 with the build material distributor 120. Similarly, as the first scanning carriage 106 moves bi-directionally along the first scanning axis 114, the apparatus 100 may emit energy via the energy sources 118 to apply energy to a build layer in the build area 104.

The apparatus 100 comprises an agent distributor 122 coupled to the second scanning carriage 108. Accordingly, as the second scanning carriage moves along the second scanning axis 116, the apparatus may selectively distribute agent on a build layer in the build area 104 with the agent distributor 122. As will be appreciated, the example arrangement of the agent distributor 122, energy sources 118, and/or build material distributor 120 may be different in other examples. In another example, a build material distributor and an agent distributor may be coupled to a common scanning carriage. Other examples may comprise other arrangements.

As shown, the apparatus 100 further comprises a controller 130, where the controller is connected to the first scanning carriage 106, the second scanning carriage 108, the build layer temperature sensors 110, the energy sources 118, the build material distributor 120, and the agent distributor 122. Therefore, the controller 130 may receive sensor data from the build layer temperature sensors 110, and the controller 130 may control operation of the first scanning carriage 106, the second scanning carriage 108, the build layer temperature sensors 110, the energy sources 118, the build material distributor 120, and the agent distributor 122.

As shown, the controller 130 comprises at least one processing resource 132 and a memory resource 134. As discussed previously, the processing resource 132 may comprise a data processor, CPU, ASIC, or other such arrangements of logical components for processing data. Furthermore, the memory resource 134 may comprise a machine-readable storage medium. The memory resource 136 comprises instructions 136, where the instructions 136 are executable by the processing resource 132. Execution of the instructions 136 may cause the processing resource 132 and/or apparatus 100 to perform the functionalities, processes, and/or sequences of operations described herein.

For example, execution of the instructions 136 by the processing resource 132 may control movement of the scanning carriages 106, 108. As another example, execution of the instructions 136 may cause the build layer temperature sensors 110 to generate sensor data associated with a build layer. In some examples, execution of the instructions 136 may cause the controller 130 to determine a first build layer temperature for a first build layer distributed in the build area with the build layer temperature sensors 110. In some examples, execution of the instructions 136 may cause the controller 130 to control the build material distributor 120 to distribute a second build layer of build material on top of the first layer of build material. In addition, execution of the instructions may cause the controller 130 to determine a second build layer temperature for the second build layer with the build layer temperature sensors 110. Furthermore, execution of the instructions may cause the controller 130 to analyze build layer coverage for the second build layer based at least in part on the second build layer temperature and the first build layer temperature.

FIGS. 4-9 provide flowcharts that provide example sequences of operations that may be performed by an example apparatus and/or a controller thereof to perform example processes and methods as described herein. In some examples, some operations included in the flowcharts may be embodied in a memory (such as the memory resource 134 of FIG. 3) in the form of instructions that may be executable by a processing resource to cause an apparatus and/or controller to perform the operations corresponding to the instructions. Additionally, the examples provided in FIGS. 4-9 may be embodied in computing devices, machine-readable storage mediums, processes, and/or methods. In some examples, the example processes and/or methods disclosed in the flowcharts of FIGS. 4-9 may be performed by a controller implemented in an apparatus.

FIG. 4 is a flowchart 150 that illustrates an example sequence of operations that may be performed by an example apparatus for generating a three-dimensional object. In this example, a controller may control a build material distributor of the apparatus to distribute a particular build layer in a build area of the apparatus over a previous build layer (block 152). The controller may determine a build layer temperature for the particular build layer with a build layer temperature sensor of the apparatus (block 154). The controller may analyze build layer coverage for the particular build layer based at least in part on the build layer temperature for the particular build layer and a build layer temperature of the previous build layer (block 156). Based at least in part on the build layer coverage determined for the particular build layer, the controller may control the build material distributor to selectively recoat the particular build material with additional build material (block 158).

As will be appreciated, controlling the build material distributor to selectively recoat the particular build layer may comprise: controlling the build material distributor to recoat the particular build layer with additional build material if the build layer coverage of the particular build layer is insufficient; and not controlling the build material distributor to recoat the particular build layer with additional build material if the build layer coverage of the particular build layer is sufficient. As will be appreciated, if the build layer coverage of the particular build layer is sufficient, the controller may proceed to performing other operations associated with a layer-wise additive manufacturing process (e.g., controlling an agent distributor to distribute agent on the particular layer, controlling an energy source to apply energy to the particular build layer, etc.).

FIG. 5 is a flowchart 200 that illustrates an example sequence of operations that may be performed by an example apparatus for generating a three-dimensional object. In this example, a controller of the apparatus may determine a build layer temperature for a first build layer with a build layer temperature sensor of the apparatus (block 202). Furthermore, in this example, the controller may determine a pre-delivery build material temperature for build material stored in a pre-delivery receptacle with a pre-delivery receptacle temperature sensor (block 204).

A heating element of the apparatus that is positioned proximate the pre-delivery receptacle to pre-heat build material prior to distribution may be controlled by the controller based at least in part on the pre-delivery build material temperature and the build layer temperature of the first build layer (block 206). In some examples, the controller may pre-heat build material before distributing build material, where pre-heating of the build material may facilitate improved object formation accuracy as well as reduce energy usage in fusing operations. In these examples, build material may be pre-heated to an optimal working temperature, where the optimal working temperature may be based at least in part on material properties of the build material. In addition, the optimal working temperature may be based at least in part on a build layer temperature of a build layer upon which the build material is to be distributed. For example, build material to be distributed may be pre-heated to a temperature that is within a predefined range of the build layer temperature upon which the build material is to be distributed. In some examples, build material may be pre-heated to a range of approximately 150° Celsius to approximately 185° Celsius. As will be appreciated, preheating of build material may be based at least in part on material properties of the build material. For example, a build material composed of Polyamide 11 (PA-11) (also known as Nylon 11) may be preheated to a range of approximately 155° Celsius to approximately 165° Celsius. As another example, a build material composed of Polyamide 12 (PA-12) (also known as Nylon 12) may be preheated to a range of approximately 165° Celsius to approximately 175° Celsius.

The controller may control a build material distributor of the apparatus to distribute pre-heated build material in the build area on top of the first build layer as a second build layer (block 208). After distributing build material for the second build layer, the controller may determine a build layer temperature for the second build layer (block 210). The controller may analyze build layer coverage for the second build layer based at least in part on the build layer temperature for the first build layer and the build layer temperature for the second build layer (block 212).

As discussed previously, a build layer temperature includes a temperature for each location of a build layer. As will be appreciated, temperatures at locations of a build layer may vary. In some examples, analyzing a build layer coverage may comprise identifying locations of a build layer at which a temperature is greater than the temperature of proximate locations of the build layer. In such examples, locations at which the temperature is greater than proximate locations may correspond to an area where a sufficient amount of build material was not distributed.

FIG. 6 provides a flowchart 250 that illustrates an example sequence of operations that may be performed by an example apparatus. In this example, a controller of the example apparatus may determine a build layer temperature of a first build layer with a build layer temperature sensor (block 252). The controller controls a build material distributor of the apparatus to distribute a second build layer of build material in the build area and on top of the first build layer (block 254). The controller may determine a build layer temperature of the second build layer with the build layer temperature sensor (block 254). The controller analyzes build layer coverage for the second build layer based at least in part on the build layer temperature of the first build layer and the build layer temperature of the second build layer to determine whether build layer coverage is sufficient or insufficient (blocks 258-260).

In response to determining that the build layer coverage for the second build layer is insufficient (i.e., not sufficient) ("N" branch of block 260), the controller may control the build material distributor to recoat the second build layer with additional build material (block 262). For example, if a group of neighboring locations (e.g., an area) of the second build layer is determined to have an inadequate amount of build material, the example apparatus may determine that build layer coverage is insufficient. In this example, the controller may control the build material distributor to distribute additional build material at the group of neighboring locations of the second build layer. After recoating the second build layer, the controller may repeat determining the build layer temperature for the second build layer and analyzing the build layer coverage (blocks 256-260).

In response to determining that the build layer coverage for the second build layer is sufficient ("Y" branch of block 260), the controller may control an agent distributor of the apparatus to selectively distribute agent in the build area on the second build area (block 264). After selectively distributing agent, the controller may control at least one energy source of the apparatus to temporarily apply energy to the second build layer (block 266). Accordingly, examples described herein may control operation of various components of an example apparatus based at least in part on build layer coverage of a build layer. In turn, build layer coverage may be analyzed based at least in part on a build layer temperature of a topmost build layer (e.g., a second build layer) and a build layer temperature of a build layer upon which the topmost build layer was distributed (e.g., a first build layer).

FIG. 7 provides a flowchart 300 that illustrates an example sequence of operations that may be performed by an apparatus to analyze build layer coverage of a build layer during generation of a three-dimensional object. In this example, for a first build layer temperature of a first build layer and a second build layer temperature of a second build layer (block 302), the apparatus (and a controller thereof) may compare temperatures of corresponding locations for the first build layer and the second build layer (block 304). As will be appreciated, the second build layer corresponds to a topmost build layer upon which various operations of a layer-wise additive manufacturing process are being performed, and the first build layer corresponds to a build layer upon which the second build layer is distributed. Hence, operations of a layer-wise additive manufacturing process have been performed on the first build layer. It will be appreciated that in some examples fusing has been performed for the first build layer prior to distribution of the second build layer. Therefore, in some examples, the build layer temperature of the first build layer may be greater than the build layer temperature for the second build layer after distribution of the second build layer.

Moreover, as discussed previously, a location of a build layer may be described relative to a position on the build area, where corresponding locations for different build layers vary in the build direction (i.e., vertically). Therefore, examples similar to the example of FIG. 7 may analyze a temperature for a location of the first build layer and a temperature for a corresponding location of the second build layer.

Examples detect temperature edges for locations of the second build area (block 306). A temperature edge may correspond to a group of neighboring locations (i.e., an area) at which a temperature is at least 5° Celsius different than temperatures for proximate locations. Furthermore, a temperature edge may correspond to a group of neighboring locations for a second build layer for which temperatures thereof are within a predefined range of temperatures of corresponding locations for a first build layer. Detection of temperature edges for locations of a build layer may correspond to locations at which an inadequate amount of build material was distributed for the build layer.

For example, temperatures for locations of a second build layer may be approximately equal to temperatures for corresponding locations of a first build layer if no build material was distributed for the second build layer at the locations (which may be referred to as a hole). As another example, temperatures for locations of a second build layer may be within a predefined range (e.g., 5° Celsius, 10° Celsius, etc.) of temperatures for corresponding locations of a first build layer if an inadequate/insufficient amount of build material was distributed at the locations of the second build layer (which may be referred to as a lightly covered area).

Therefore, based on the detection of temperature edges for temperatures of locations of the second build layer, the apparatus may determine whether any holes or lightly covered areas are present for the second build layer (block 308). In response to determining that holes or lightly covered areas are not present ("N" branch of block 308), the apparatus may determine that the build layer coverage is sufficient for the second build layer (block 310). In response to determining the presence of holes or lightly covered areas for the second build layer ("Y" branch of block 308), the apparatus may determine whether holes or light coverage areas present in the second build layer correspond to the three-dimensional object to be generated (block 312). As will be appreciated, in some examples, if a hole or light coverage is present in a build layer, but the locations where such hole or light coverage occurs does not correspond to the part area or the object to be generated ("N" branch of block 312), some examples may determine that the build layer coverage is sufficient (block 310). However, in response to determining that the hole or light coverage area corresponds to the part area or object to be generated ("Y" branch of block 312), some examples may determine that the build layer coverage is insufficient (block 314).

Turning now to FIG. 8, this figure provides a flowchart 350 that illustrates an example sequence of operations that may be performed by an example apparatus to generate a three-dimensional object. As shown, the apparatus may apply energy to a first build layer of build material in the build area with an energy source (block 352). As will be appreciated, the application of energy may cause fusing of a portion of the first build layer that corresponds to the three-dimensional object to be generated. The apparatus may distribute a second build layer of build material over the first layer of build material in the build area with a build material distributor (block 354). The apparatus may determine a build layer temperature for the second build layer with a build layer temperature sensor (block 356). The apparatus may analyze build layer coverage of the second build layer based at least in part on the build layer temperature for the second build layer and a build layer temperature for the first build layer (block 358). Based at least in part on the build layer coverage for the locations of the second build layer, examples may selectively recoat the second build layer with additional build material (block 360). In some examples, selectively recoating the second build layer may comprise recoating the second build layer if build layer coverage is insufficient, and selectively recoating the second build layer may comprise not recoating the second build layer if build layer coverage is sufficient.

FIG. 9 provides a flowchart 400 that illustrates an example sequence of operations that may be performed by an example apparatus to generate a three-dimensional object. As shown, the apparatus may apply energy to a first build layer of build material in a build area of the apparatus with an energy source (block 402). The apparatus may determine a first build layer temperature for the first build layer with a build layer temperature sensor (block 404). The apparatus may determine a pre-delivery build material temperature for build material to be distributed in the build area with a pre-delivery receptacle temperature sensor (block 406).

Based on the pre-delivery build material temperature and the first build layer temperature, the apparatus may pre-heat the build material to be distributed in the build area with at least one heating element (block 408). As will be appreciated, the build material may be pre-heated to a predefined optimal temperature for performing layer-wise additive manufacturing operations thereon. After pre-heating the build material, the apparatus may distribute the pre-heated build material in the build area on top of the first build layer as a second build layer of build material with a build material distributor (block 410).

The apparatus may determine a second build layer temperature for the second build layer with the build layer temperature sensor (block 412). Based at least in part on the first build layer temperature and the second build layer temperature, the apparatus may analyze build layer coverage for the second build layer to determine whether build layer coverage for the second build layer is sufficient (blocks 414-416). In response to determining that build layer coverage is insufficient ("N" branch of block 416), the apparatus may recoat the second build layer with additional build material with the build material distributor (block 418). In response to determining that the build layer coverage for the second build layer is sufficient ("Y" branch of block 416), the apparatus may selectively distribute agent on the second build layer in the build area with an agent distributor (block 420).

Therefore, example apparatuses and processes described herein facilitate build layer coverage analysis based at least in part on build layer temperatures. Furthermore, examples may pre-heat build material prior to distribution thereof based at least in part on a build layer temperature for a build layer upon which the build material is to be distributed. As will be appreciated, some examples may compensate for insufficient build layer coverage by recoating a build layer with additional build material in locations in which build material coverage is inadequate. Examples described herein may facilitate improved selectivity in apparatuses and methods for generating three-dimensional objects. Furthermore, examples may improve mechanical strength for objects generated with apparatuses, methods, and processes described herein.

The preceding description has been presented to illustrate and describe examples of the principles described. This description is not intended to be exhaustive or to limit these principles to any precise form disclosed. Many modifications and variations are possible in light of the above disclosure.

The invention claimed is:

1. An apparatus for generating a three-dimensional object, the apparatus comprising:
    a build material distributor to distribute respective build layers of build material in a build area of the apparatus;
    at least one build material heating element to heat the build material prior to distribution in the build area by the build material distributor; and,
    a controller configured to:
        determine a first build layer temperature of a location of a first build layer;
        control the build material distributor to distribute a second build layer in the build area onto, adjacent to, and over the first build layer;
        determine a second build layer temperature of a corresponding location of the second build layer;
        compare the first build layer temperature to the second build layer temperature;
        based on the comparison, determine if a sufficient amount of build material has been distributed at the corresponding location of the second build layer;
        control the build material distributor to selectively recoat the second build layer with additional build material based on the determining if a sufficient amount of build material has been distributed at the corresponding location of the second build layer; and,
        prior to controlling the build material distributor to distribute the second build layer, control the at least one build material heating element to thereby heat the build material to be distributed as the second build layer based at least in part on the first build layer temperature of the location of the first build layer.

2. The apparatus of claim 1, further comprising:
    at least one build layer temperature sensor, the controller configured to determine the first build layer temperature of the location of the first build layer with the at least one temperature sensor.

3. The apparatus of claim 1, wherein the controller configured to control the build material distributor to selectively recoat the second build layer with the additional build material comprises the controller configured to control the build material distributor to recoat the second build layer with the additional build material in response to determining that build layer coverage for the second build layer is insufficient.

4. The apparatus of claim 1, further comprising:
    an agent distributor to selectively distribute agent in the build area; and
    at least one energy source,
    wherein the controller is configured to:
        control the agent distributor to selectively distribute the agent on the second build layer in response to determining that build layer coverage for the second layer is sufficient; and
        control the at least one energy source to apply energy to the second build layer after selective distribution of the agent on the second build layer.

5. The apparatus of claim 1, wherein the controller configured to determine if a sufficient amount of build material has been distributed at the corresponding location of the second build layer comprises the controller configured to:
    detect temperature edges for locations of the second build layer based at least in part on the first build layer temperature of the location of the first build layer.

6. The apparatus of claim 1, wherein the build material distributor comprises at least one pre-delivery receptacle to store the build material prior to distribution, the at least one build material heating element disposed within the pre-delivery receptacle to heat the build material stored therein,
    wherein the apparatus further comprises at least one pre-delivery receptacle temperature sensor,
    wherein the controller is configured to:
        determine a pre-delivery build material temperature with the at least one pre-delivery receptacle temperature sensor, and control the at least one build material heating element to thereby heat the build material to be distributed based at least in part on the pre-delivery build material temperature.

* * * * *